United States Patent
Kremer et al.

(10) Patent No.: US 9,244,962 B2
(45) Date of Patent: *Jan. 26, 2016

(54) DYNAMIC STORAGE BLOCKS TIERING

(71) Applicant: Precise Software Solutions, Inc., Redwood Shores, CA (US)

(72) Inventors: Mark Kremer, Redwood City, CA (US); Yochai Uliel, Yehuda (IL); Liad Hacmon, Yehuda (IL); Chuck Delouis, New York, NY (US)

(73) Assignee: PRECISE SOFTWARE SOLUTIONS, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,198

(22) Filed: Jul. 23, 2014

(65) Prior Publication Data
US 2014/0337360 A1  Nov. 13, 2014

Related U.S. Application Data

(63) Continuation of application No. 13/012,555, filed on Jan. 24, 2011, now Pat. No. 8,819,057.

(60) Provisional application No. 61/298,849, filed on Jan. 27, 2010.

(51) Int. Cl.
G06F 17/30 (2006.01)
G06Q 10/10 (2012.01)

(52) U.S. Cl.
CPC ...... *G06F 17/30312* (2013.01); *G06F 17/3053* (2013.01); *G06F 17/30306* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 6,094,680 | A | 7/2000 | Hokanson |
| 6,957,433 | B2 | 10/2005 | Umberger et al. |
| 7,293,133 | B1 | 11/2007 | Colgrove et al. |
| 7,441,096 | B2 | 10/2008 | Kitamura |
| 2002/0188592 | A1 | 12/2002 | Leonhardt et al. |
| 2006/0074961 | A1 | 4/2006 | Kongalath |
| 2007/0073655 | A1 | 3/2007 | Chen |

*Primary Examiner* — Son T Hoang
(74) *Attorney, Agent, or Firm* — Park, Vaughan, Fleming & Dowler LLP; Shane Nelson

(57) ABSTRACT

Storage management for database access, in which selected data blocks are associated with particular business operations, and in which those data blocks are disposed in response to an assessment of which of those business operations are more important, more urgent, or have a greater need to be reliable. This has the effect that overall transaction performance is improved without significantly increasing infrastructure cost. Noting the relative importance of those particular business transactions and the relative probability that those data blocks will be needed by those particular business transactions, and assuring that data blocks associated with relatively important business transactions are moved to relatively superior storage in advance of requests for access.

18 Claims, 2 Drawing Sheets

DYNAMIC STORAGE BLOCKS TIERING

PRIORITY

This application is a continuation of, and hereby claims priority to, pending U.S. patent application Ser. No. 13/012,555, which was filed on Jan. 24, 2011, and which is entitled, "Dynamic Storage Blocks Tiering", which claims the benefit of U.S. provisional patent application No. 61/298,849, filed on Jan. 27, 2010 in the name of the same inventors. The entire contents of each of these applications are incorporated herein by reference.

BACKGROUND

In multi-tiered enterprise production systems, there will often be significant contention for resources among differing programs that perform transactions on databases, located on configured DBMS servers. In particular, certain data blocks, needed to perform concurrent requested transactions, must generally be available to those databases and their respective DBMS servers to perform the requested transactions and to respond to the requesting program.

In many such systems, storage devices maintaining data for one or more DBMS servers might vary significantly, such as in size, latency, and data transmission rate. These factors can significantly affect the responsiveness of the DBMS server in performing and responding to transactions. If these storage devices are not well-disposed, it can lead to a significant reduction in the ability of the various elements of the system to respond rapidly, or even reliably.

SUMMARY OF THE DESCRIPTION

This description includes techniques, including methods, physical articles, and systems, which provide storage management, for example and without limitation, for data access, in which selected data blocks are associated with particular business operations, and in which those data blocks are disposed in response to, inter alia, an assessment of which of those business operations are more important, more urgent, or require greater reliability, to the organization operating the system.

Often, a relatively small fraction of those data blocks are relatively more frequently accessed while a remaining larger fraction of data blocks is only infrequently accessed. Accessing the data may be in response to relative business importance of the program accessing the data, for example and without limitation, some programs making business requests of relatively lesser importance while others making relatively more important business requests for access.

The techniques described in this disclosure provide for disposition of selected data blocks, with the effect that transaction performance is improved without significantly increasing infrastructure cost. One method for disposing such data blocks is to associate each of them with particular business transactions, not necessarily with particular database operations. Thus, each business transaction might be associated with its particular application program, its particular I/O technique, with program objects (for example and without limitation, Java or .Net objects), with SQL or otherwise-formatted statements used to interface with the database system, with database system objects and programs involved in that interface, and with the data blocks that are used to perform the particular database operation. Such a method might note the relative importance of those particular business transactions and the relative probability that those data blocks will be needed by those particular business transactions, and might assure that data blocks associated with relatively important business transactions are moved to a relatively superior storage device (such as, for example, relatively faster, having relatively less latency, or being relatively more reliable) in advance of requests for access thereto.

For example and without limitation, methods and systems might be disposed to receive transactions, to associate those transactions each with its own set of affected data blocks, to identify an order in which to perform those transactions (such as, for example, in response to the relative priority of the business need, or otherwise), and to arrange access such that those data blocks needed for earlier such transactions are ready at relatively superior storage devices before those data blocks are needed to actually perform those transactions. While care is taken that the needed data blocks are timely ready, there is no particular reason why any other aspect of the interaction between the database system and its users need change in any way.

Real-World Nature

This disclosure includes techniques, including methods, physical articles, and systems, that receive real-world information dictated by real-world conditions (not mere inputs to a problem-solving technique). The techniques provided are transformative of the information received, at least in the sense that incoming data is reordered and allocated to particular times and priorities. This has the effect that a first type of information (e.g., incoming message units) is transformed into a second type of information (e.g., relative priority of outgoing message units).

Additionally, physical articles may be transformed according to the techniques and methods disclosed herein, at least in the sense that data, maintained in one form using a physical storage device, is transformed when maintaining that data in a distinct form on that physical storage device, or a separate storage device, along with transforming the associated one or more physical storage devices.

This disclosure includes techniques that are tied to a particular machine, at least in the sense that allocation of time and bandwidth is performed in a communication system. While this description is primarily directed to that portion of an invention in which a database server plays a prominent role, this description also shows that a database server alone (i.e., without appropriate instructions) would not necessarily be sufficient to perform methods, or comprise systems, within the scope and spirit of this disclosure.

DETAILED DESCRIPTION

Generality of the Description

Figure 1:
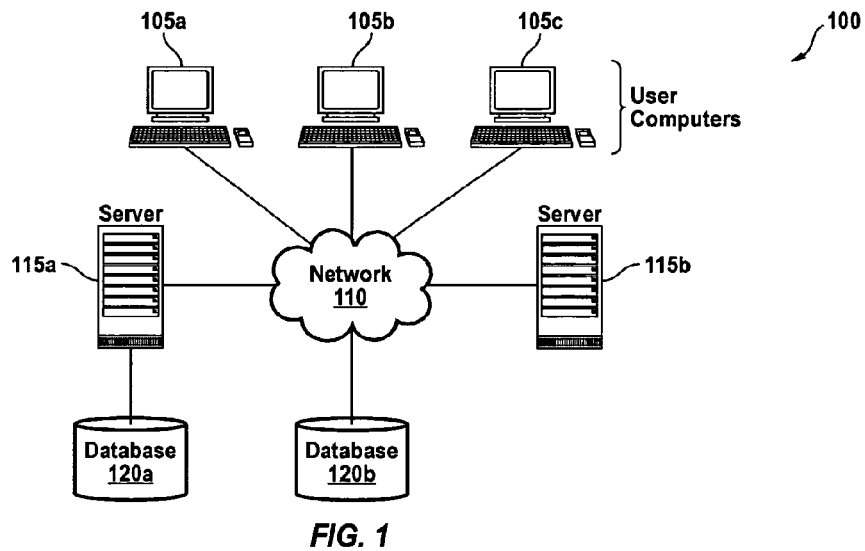
FIG. 1 shows a conceptual diagram of an enterprise database system.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

The invention is not in any way limited to the specifics of any particular examples disclosed herein. Many other variations are possible which remain within the content, scope and spirit of the invention, and these variations would become clear to those skilled in the art after perusal of this application.

DEFINITIONS AND NOTATIONS

The following definitions and notations are exemplary, and not intended to be limiting in any way:

The phrases "data block", and the like, generally refer to both storage regions which might be reserved in a storage device, and to the data maintained by those storage regions. For example and without limitation, data blocks might refer either to disk sectors or to the data stored therein.

The acronym "DBMS" generally refers to Database Management System, which might be employed to maintain data or operate on data which is stored in a structure format. For example and without limitation, a DBMS may store data in a relational database, a structured file such as an XML file and the like.

The words "tier" and "tiering" generally refer to a client-server software architecture in which the presentation, the application processing, and the data management are logically separate processes which may or may not be performed on the same processing device.

The phrase "band width", the word "bandwidth", and the like, generally refer to the carrying capacity of a data interconnect. High-bandwidth connections are also called high-speed connections, because they can transmit large quantities of data very quickly.

After reading this application, those skilled in the art would recognize that these definitions and notations would be applicable to techniques, methods, physical elements, and systems, not currently known, or not currently known to be applicable by the techniques described herein, including extensions thereof that would be inferred by those skilled in the art after reading this application, even if not obvious to those of ordinary skill in the art before reading this application.

Figures and Text

Where described as shown in a figure, an element might include:

Other items shown in the figure in addition to, or operating in combination or conjunction with, that particular element (or that particular element in combination or conjunction with other elements, whether shown or not shown in the figure, and whether described or not described with respect to the figure).

Other items not shown in the figure, but whose inclusion would be known to those skilled in the art, or which would be known after reasonable investigation, without further invention or undue experimentation.

Subparts of that element, whether shown or not shown in the figure, which might be convenient for operation of the element, but which are not necessarily required in the described context, or which might be necessary for operation of the element in the described context, but which are not necessary for description at a level understandable to those skilled in the art.

The methods and techniques described herein may be performed on a processor-based device. The processor-based device will generally comprise a processor attached to one or more memory devices or other tools for persisting data. These memory devices will be operable to provide machine-readable instructions to the processors and to store data, including data acquired from remote servers and data from remote storage devices. The processor will also be coupled to various input/output (I/O) devices for receiving input from a user or another system and for providing an output to a user or another system. These I/O devices include human interaction devices such as keyboards, touchscreens, displays and terminals as well as remote connected computer systems, modems, radio transmitters and handheld personal communication devices such as cellular phones, "smart phones" and digital assistants.

FIG. 1

FIG. 1 shows a conceptual diagram of an enterprise database system. A system 100 includes elements as shown in the figure, including at least one or more user computers 105 (e.g., computers 105*a*, 105*b*, and 105*c*). User computers 105 can be general purpose personal computers (including, merely by way of example, personal computers and/or laptop computers running any appropriate version of Microsoft Corp.,'s Windows and/or Apple Corp.,'s Macintosh operating systems) and/or workstation computers running any of a variety of commercially-available UNIX or UNIX-like operating systems. These user computers 105 can also have any of a variety of applications, including one or more applications configured to perform methods of the invention, as well as one or more office applications, database client and/or server applications, and web browser applications.

Alternatively, user computers 105 can be any other electronic device, such as a thin-client computer, Internet-enabled mobile telephone, and/or personal digital assistant, capable of communicating via a network (e.g., network 110 described below) and/or of displaying and navigating web pages or other types of electronic documents. Although the exemplary system 100 is shown with three user computers, any number of user computers can be supported.

Certain embodiments of the invention operate in a networked environment, which can include a network 110. Network 110 can be any type of network familiar to those skilled in the art that can support data communications using any of a variety of commercially-available protocols, including without limitation TCP/IP, SNA, IPX, AppleTalk, and the like. Merely by way of example, network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth protocol known in the art, and/or any other wireless protocol; and/or any combination of these and/or other networks.

Embodiments of the invention can include one or more server computers 115 (e.g., computers 115*a* and 115*b*). Each of server computers 115 may be configured with an operating system including without limitation any of those discussed above, as well as any commercially-available server operating systems. Each of server computers 115 may also be running one or more applications, which can be configured to provide services to one or more clients (e.g., user computers 105) and/or other servers (e.g., server computers 115).

Merely by way of example, one of server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 105 to perform methods of the invention.

Server computers 115, in some embodiments, might include one or more file and or/application servers, which can include one or more applications accessible by a client running on one or more of user computers 105 and/or other server computers 115. Merely by way of example, one or more of server computers 115 can be one or more general purpose computers capable of executing programs or scripts in response to user computers 105 and/or other server computers 115, including without limitation web applications (which might, in some cases, be configured to perform methods of the invention).

Merely by way of example, a web application can be implemented as one or more scripts or programs written in any programming language, such as Java, C, C# or C++, and/or any scripting language, such as Perl, Python, or TCL, as well as combinations of any programming/scripting languages. The application server(s) can also include database servers, including without limitation those commercially available from Oracle, Microsoft, Sybase, IBM and the like, which can process requests from database clients running on one of user computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to a user computer 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on a user computer 105 and/or another server 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120a and 120b). The location of the database(s) 120 is discretionary: merely by way of example, a database 120a might reside on a storage medium local to (and/or resident in), or accessible by, server computer 115a (and/or one or more of user computers 105).

Alternatively, a database 120b can be remote from any or all of user computers 105 and server computers 115, so long as it can be in communication (e.g., via network 110) with one or more of these. In a particular set of embodiments, databases 120 can reside in a storage-area network ("SAN") familiar to those skilled in the art. (Similarly, any necessary files for performing the functions attributed to user computers 105 and server computers 115 might be stored locally on the respective computer and/or remotely, as appropriate.) In one set of embodiments, one or more of databases 120 can be a relational database, such as an Oracle database, that is adapted to store, update, and retrieve data in response to SQL-formatted commands. Databases 120 might be controlled and/or maintained by a database server, as described above, for example.

FIG. 2

Figure 2:
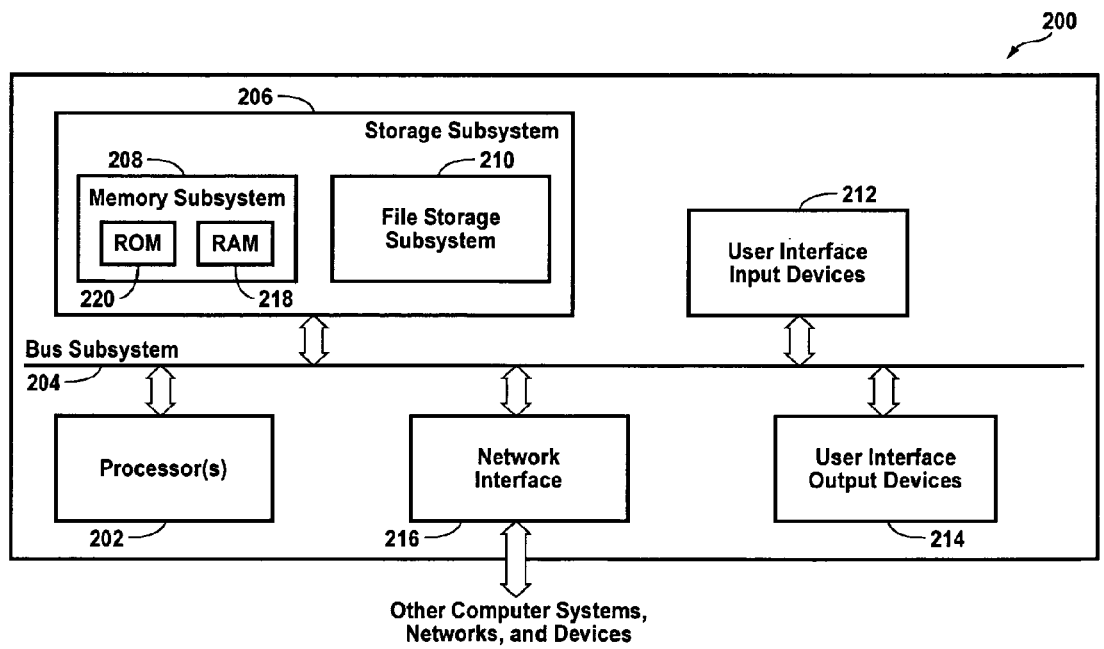
FIG. 2 shows a simplified block diagram of a computer system that may be used in some embodiments of the present invention.

FIG. 2 shows a simplified block diagram of a computer system 200 that may be used to practice embodiments of the present invention. As shown in the FIG. 2, computer system 200 includes a processor 202 that communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216.

The bus subsystem 204 provides a mechanism for letting the various components and subsystems of computer system 200 communicate with each other as intended. Although the bus subsystem 204 is shown schematically as a single bus, alternative embodiments of the bus subsystem may utilize multiple busses.

The network interface subsystem 216 provides an interface to other computer systems, and networks, and devices. Network interface subsystem 216 serves as an interface for receiving data from and transmitting data to other systems from computer system 200.

The user interface input devices 212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 200.

The user interface output devices 214 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 200.

The storage subsystem 206 may be configured to store the basic programming and data constructs that provide the functionality of the present invention. Software (such as, for example, code modules or instructions) that provides the functionality of the present invention may be stored in storage subsystem 206. These software modules or instructions may be executed by processor(s) 202. Storage subsystem 206 may also provide a repository for storing data used in accordance with the present invention. Storage subsystem 206 may comprise memory subsystem 208 and file/disk storage subsystem 210.

The memory subsystem 208 may include a number of memories including a main random access memory (RAM) 218 for storage of instructions and data during program execution and a read only memory (ROM) 220 in which fixed instructions are stored. The file storage subsystem 210 provides persistent storage for program and data files, such as for example non-volatile storage, and may include a hard disk drive, a floppy disk drive along with associated removable media, a Compact Disk Read Only Memory (CD-ROM) drive, a DVD, an optical drive, removable media cartridges, and other like storage media.

The computer system 200 can be of various types including a personal computer, a portable computer, a workstation, a network computer, a mainframe, a kiosk, or any other data processing system. Due to the ever-changing nature of computers and networks, the description of computer system 200 depicted in the FIG. 2 is intended only as a specific example for purposes of illustrating the preferred embodiment of the computer system. Many other configurations having more or fewer components than the system depicted in the FIG. 2 are possible.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

FIG. 3

Figure 3:
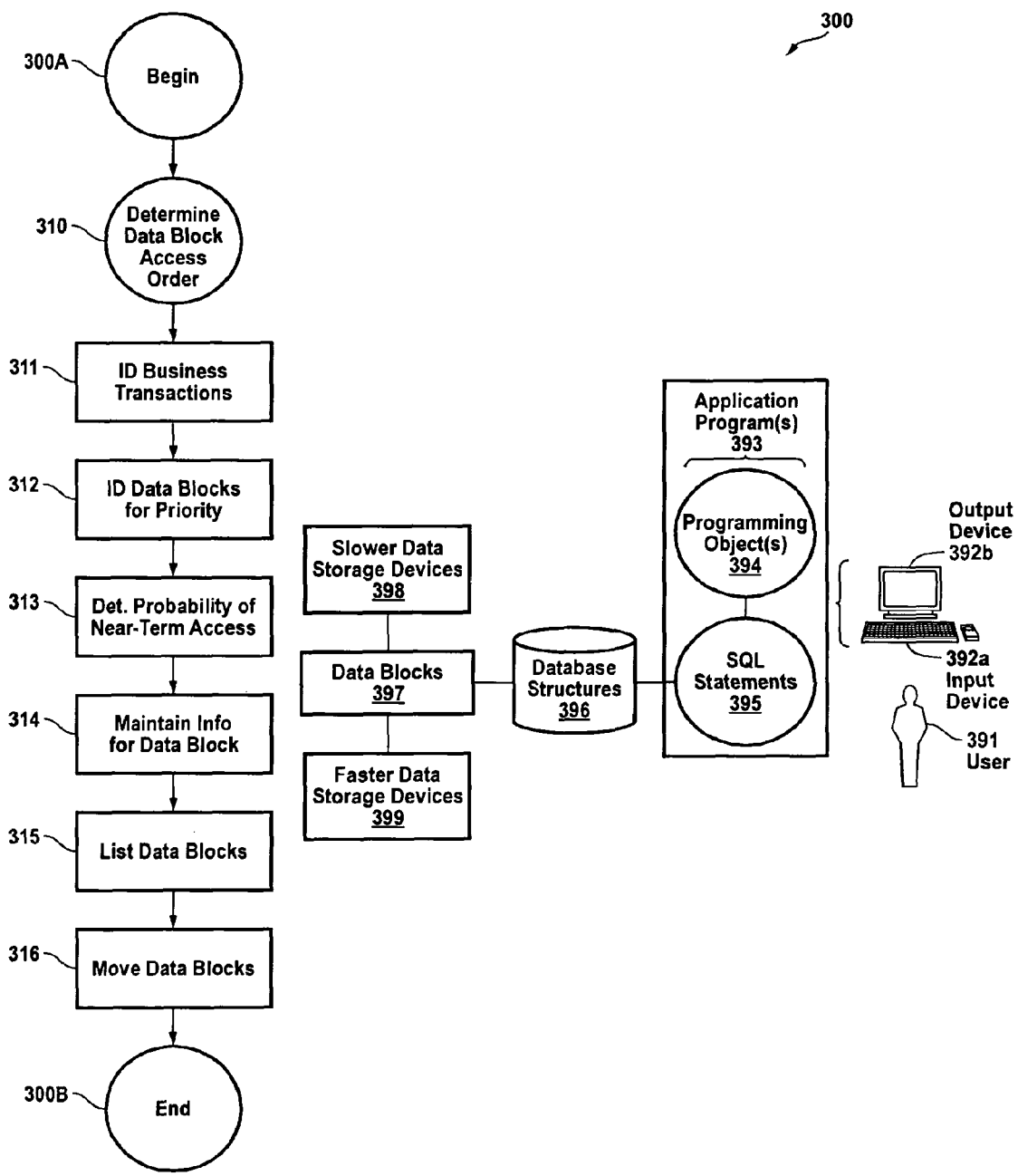
FIG. 3 shows a conceptual diagram of an example method.

FIG. 3 shows a conceptual diagram of an example method.

A method 300 includes flow labels and method steps as shown in the figure, including at least those described below.

Beginning of Method

A flow label 300A indicates a beginning of the method 300. For example and without limitation, the method 300 might begin with a database system in a state of readiness to receive transaction requests.

Techniques described herein are applicable to methods and systems in which there are both relatively faster and relatively slower storage devices. However, in the context of the invention, there is no particular need for any such limitation. For example and without limitation, the database described herein might be or might include a collaborative workspace, or any other system in which it is desired that user priorities take precedence over those more convenient to the system.

Associated Data Structures

One or more of the flow labels or method steps might be associated in the FIG. 3 with data structures, data transfers, or otherwise, that might present further and other explanation. As the FIG. 3 shows a conceptual diagram, this should pose no serious problem to the reader.

Business Transaction Linkage

The FIG. 3 includes at least the elements as described below. A user 391 might be situated so as to have access to I/O devices 392a (input) and 392b (output), some combination or conjunction thereof, or otherwise. While this description is presented with emphasis on the user 391 being one or more human beings, in the context of the invention, there is no particular requirement for any such limitation. For example and without limitation, the user 391 might include one or more remote login terminals, one or more trained animals, one or more sensors, one or more artificial intelligence devices or programs, some combination or conjunction thereof, or otherwise.

As described herein, the I/O devices 392a and 392b might be associated with one or more application programs 393 or program layers, which are envisioned to provide the business functions accessible by the user 391. The application programs 393 are themselves associated with one or more programming objects 394. For example and without limitation, these programming objects 394 might include Java/.Net objects, but there is no particular reason for limitation to any particular computer programming paradigms. The programming objects 394 might themselves be coupled, compiled, interpreted, or otherwise transformed into SQL statements 395, often used at this writing to interface with database systems, but again, there is no particular reason for limitation to any particular database system paradigms. The SQL statements 395 might themselves be associated with database structures 396, such as objects in object-oriented databases, relational tables in RDMS systems, or otherwise. The database structures 396 are themselves associated with actual data blocks 397, by which data and storage are contemplated.

As described herein, the actual data blocks 397 might be associated with particular data storage devices, for example and without limitation, relatively slower data storage devices 398 and relatively faster data storage devices 399. As a general rule, relatively superior equipment is often relatively more expensive, prompting many database systems and other systems to have relatively more of the former and relatively less of the latter. As the relatively faster data storage devices 399 are both fewer and superior, it is contemplated that data blocks 397 would preferably be associated therewith, if those data blocks 397 are likely to be accessed relatively sooner.

Determining a Preferred Order

At a flow label 310, the method 300 is ready to determine a preferred order for data blocks to be accessed.

At a step 311, the method 300 identifies those business transactions in use (or possibly, potentially in use), and determines their relative importance. Such relative importance might be assigned in one or more ways:

- The relative importance might be assigned in response to one or more users 391. For example and without limitation, a user 391 launching an urgent program to counter an external malware attack.
- The relative importance might be assigned in response to a managerial directive or to a type of the business transaction. For example and without limitation, a requirement that end-of-quarter and end-of-year accounting reconciliation and reporting take precedence over routine engineering.
- The relative importance might be assigned in response to a usage pattern. For example and without limitation, a business transaction that is run regularly and is likely to take awhile (such as a routine overnight backup operation) might be assigned a relatively lower priority.
- The relative importance might be assigned in response to data presented by the business transaction itself. For example and without limitation, the business transaction might glean relatively more priority from a particular URL for which access is sought, or otherwise.
- The relative importance might be assigned in response to which portions of the database for which access is sought. For example and without limitation, inventory and sales data might be considered important, with the effect that business transactions seeking to access those portions of the database might thereby have relatively more priority.
- The relative importance might be assigned in response to an access pattern, such as an access frequency or an access method (random access or sequential access). For example and without limitation, those business transactions for which the needed data blocks are easily predictable might have relatively more priority thereby.

The relative importance might be assigned in response to anticipated transactions resulting from an analysis of historical transactions.

This list is of course not intended to be exhaustive, merely exemplary. There are many other methods by which relative priority might be assigned, adjusted, altered, or otherwise.

At a step 312, the method 300 identifies those data blocks 397 for which the method 300 should pay particular attention and possibly grant particular priority to. Such identification might occur in one or more ways:

The method 300 might maintain statistics regarding the relative frequency of access for each such data block 397. As there are often a relatively large numbers of such data blocks 397, the method 300 would preferably retain only such data that would allow a conclusion that is statistically significant. For example and without limitation, the method 300 might restrict itself to only those data blocks 397 accessed sufficiently frequently that it makes sense to measure that frequency. Significance may be identified using heuristic techniques or using one of a wide variety of statistical methods.

At a step 313, the method 300 determines a probability of near-term access for those data blocks 397 in the just-earlier step 312. As noted above, such a probability might be determined in one or more ways:

The method 300 might maintain relatively long-term and relatively static statistics regarding the relative frequency, for each such data block 397, of access.

The method 300 might maintain a relative probability of bursty access, and of the relatively short-term and relatively dynamic statistics associated with any such bursty event.

As noted above, this list is of course not intended to be exhaustive, merely exemplary. There are many other methods by which probability of near-term access might be assigned, adjusted, altered, or otherwise.

At a step 314, the method 300 maintains a set of information for each data block 397. Preferably, this set of information includes: (a) an ID, identifying the data block 397, (b) a rank, indicating a significance of the business transaction with which that data block 397 is associated, (c) a measure of "impact" or cost, indicating a measure of time likely to be expended operating with this particular data block 397, (d) a method, indicating whether access to this particular data block 397 would be random-access or sequential-access, and (e) a probability, a measure of a probability of access in the "current" time frame, for example, within the next few milliseconds.

At a step 315, the method 300 makes available a list of those data blocks 397 for which near-term access is probable and worthwhile. In a preferred embodiment, this list would be sorted by a measure combining those values, and make publicly available within the database system. For example and without limitation, the inventors contemplate that such a list would maintain high-priority data blocks 397 at the "front of the line", so that the database system might achieve best functionality by assuring access to those data blocks 397 relatively earlier (such as, first).

At a step 316, the method 300 causes the database system to move data blocks 397 from relatively slower storage elements 398 to relatively faster storage elements 399. This has the effect that when access to those particular data blocks 397 is called for, they are relatively likely to be situated in those relatively faster storage elements 399. This is contemplated to have the effect that conduct of business transactions using the database will be statistically and significantly faster (or otherwise superior, such as more reliable).

End of Method

At a flow label 300B, the method 300 is completed. The method 300 might be repeated indefinitely so long as the devices performing the method 300 (e.g., a database server or its clients) are operational.

Alternative Embodiments

The invention has applicability and generality to types of business processing systems not necessarily within the database one of the many fields of computing science.

For example and without limitation, as described above, none of the actual business transactions, software objects (such as Java Beans), SQL statements, and the like, need be changed. However, in the context of the invention, there is no need for any such limitation. If it occurs that collectivizing or partitioning one or more software objects, one or more steps, or otherwise, this would also be within the scope and spirit of the invention.

For further and other examples and without limitation, techniques described herein might be applicable to cloud computing, distributed or redundant storage systems, parallel processing, or allocation of intra-processor resources such as ALU's, I/O bandwidth, and registers.

What is claimed is:

1. A method utilizing at least a computing device for dynamic storage blocks tiering including steps of:
    associating data blocks with one or more different types of business operations, wherein
        the data blocks are associated with database structures accessible by a database server,
        the database server is coupled to at least a first storage device and a second storage device, and
        the storage devices have different performance parameters;
    maintaining a set of information for the data blocks, wherein the set of information comprises
        (i) a rank that indicates a significance of the one or more business operations with which the data blocks are associated,
        (ii) a probability of near-term access requests for the data blocks,
        (iii) a type of access to the data blocks indicating the access is random or sequential, and
        (iv) a cost measurement to be expended operating with the data blocks;
    determining an anticipated order of the one or more business operations based on two or more elements of the maintained set of information for the data blocks; and
    repositioning at least some of the data blocks between the at least first and second storage devices, wherein the repositioning includes moving a subset of one or more of the data blocks from the first storage device, the first storage device having a relatively inferior performance parameter, to the second storage device, the second storage device having a relatively superior performance parameter, in response to the step of determining.

2. The method of claim 1, wherein the step of determining includes correlating performance parameters of the at least first and second storage devices with one or more database transactions.

3. The method of claim 2, wherein one or more of the database transactions are identified with one or more of a periodicity or a measure of burstiness.

4. The method of claim 1, wherein the step of determining includes correlating data on the at least first and second storage devices with business types of anticipated transactions.

5. The method of claim 4, wherein one or more of the anticipated transactions relate to at least one of a time of a day, a time of a month, a month of a year or an annual event.

6. The method of claim 4, wherein one or more of the anticipated transaction relates to a promotional event.

7. The method as in claim 1, wherein the performance parameter includes whether access to a particular storage device is random-access versus sequential-access.

8. The method as in claim 1, wherein the one or more business operations comprises a plurality of different business operations.

9. The method as in claim 1, wherein the step of repositioning comprises moving the one or more data blocks from the first storage device to the second storage device.

10. A system for dynamic storage blocks tiering, comprising:
   a first hardware storage device having a first performance parameter;
   a second hardware storage device having a second performance parameter;
   a database server capable of individually accessing a plurality of data blocks, wherein the database server is coupled to at least the first storage device and the second storage device, wherein the data bocks are associated with database structures accessible by the database server; a processor configured to
   associate one or more of the plurality of data blocks with one or more different types of business operations,
   maintain a set of information for the plurality of data blocks,
      wherein the set of information comprises
      (i) a rank that indicates a significance of the one or more business operations,
      (ii) a probability of near-term access requests for the plurality of data blocks,
      (iii) a type of access to the plurality of data blocks indicating the access is random or sequential, and
      (iv) a cost measurement to be expended operating with the plurality of data blocks;
   determine an anticipated order of the one or more business operations based on two or more elements of the maintained set of information for the plurality of data blocks; and
   reposition at least some of the plurality of data blocks between the at least first and second storage devices, wherein the repositioning includes moving a subset of one or more of the plurality of data blocks from the first storage device, the first storage device having a relatively inferior performance parameter, to the second storage device, the second storage device having a relatively superior performance parameter, in response to the determination.

11. The system of claim 10, wherein the set of information includes one or more of a subset of one or more relatively higher priority operations or a subset of one or more transactions having a known schedule.

12. The system of claim 10, wherein the processor is configured to associate first and second groups of the plurality of data blocks with first and second measures of relative importance, the first and second measures of relative importance being responsive to types of business operations.

13. The system of claim 10, wherein the first performance parameter includes one or more of data transfer rate, latency, bandwidth or reliability.

14. The system of claim 10, wherein the set of information includes information regarding anticipated transactions.

15. The system of claim 14, wherein the anticipated transactions are identified with at least one of a periodicity, a history, or a business priority.

16. The system as in claim 10, wherein the one or more business operations comprises a plurality of different business operations.

17. The system as in claim 10, wherein the reposition comprises moving the one or more data blocks from the first storage device to the second storage device.

18. The system of claim 10, wherein the determination comprises assigning an importance to the one or more business operations based on at least one of managerial directive, usage pattern, or access frequency.

* * * * *